United States Patent [19]

Aragonés

[11] Patent Number: 5,462,720
[45] Date of Patent: Oct. 31, 1995

[54] PROCESS FOR BIOLIXIVIATING COPPER SULFIDES BY INDIRECT CONTACT WITH SEPARATION OF EFFECTS

[75] Inventor: Juan L. B. Aragonés, Madrid, Spain

[73] Assignee: Iskay Serviceis Metalurgicos Srl., Madrid, Spain

[21] Appl. No.: 184,038

[22] Filed: Jan. 21, 1994

[51] Int. Cl.$^6$ .................................................. C22B 15/00
[52] U.S. Cl. .................. 423/27; 423/24; 423/DIG. 17
[58] Field of Search .............................. 423/27, DIG. 17, 423/24; 204/106

[56] References Cited

U.S. PATENT DOCUMENTS

| | | | |
|---|---|---|---|
| 2,829,964 | 4/1958 | Zimmerley et al. | 423/DIG. 17 |
| 3,218,252 | 11/1965 | Glover et al. | 423/DIG. 17 |
| 3,856,913 | 12/1974 | McElroy et al. | 423/27 |
| 4,269,699 | 5/1981 | McCready et al. | 423/DIG. 17 |
| 4,732,608 | 3/1988 | Emmett, Jr. et al. | 423/DIG. 17 |
| 4,752,332 | 6/1988 | Wu et al. | 423/DIG. 17 |
| 4,931,262 | 6/1990 | Sonta et al. | 423/224 |

Primary Examiner—Steven Bos
Attorney, Agent, or Firm—Henry H. Skillman; Dann, Dorfman, Herrell and Skillman

[57] ABSTRACT

Process for biolixiviating minerals from copper sulfides and also from their flotation concentrates, characterized by the use of biolixiviation through indirect contact as well as separation and improvement of the chemical and biological steps of the biolixiviation process. In the chemical step, a low concentration of ferric sulfate is used as the lixiviating agent. In the biological step, bacterial films of *Thiobacillus ferrooxidans* attached to an inert solid are used to regenerate the lixiviating agent by converting the ferrous ion into ferric ion through oxidation. The regenerated agent is then recycled to the lixiviation reactor. The biolixiviation process permits complete extraction of the copper contained in the ore and results in a lixiviation liquor which contains all the copper charge and a low concentration of ferric sulfate similar to the low concentration of ferric sulfate used initially. The copper obtained can be treated without difficulty by means of extraction with solvents and electrolysis in order to obtain cathode copper.

14 Claims, 6 Drawing Sheets

PROCESS FOR BIOLIXIVIATING COPPER SULFIDES BY INDIRECT CONTACT WITH SEPARATION OF EFFECTS

FIELD OF THE INVENTION

The present invention pertains to a process for biolixiviating minerals from copper sulfides and from their flotation concentrates, characterized by the use of biolixiviation through indirect contact as well as separation and improvement of the chemical and biological steps of the biolixiviation process.

BACKGROUND OF THE INVENTION

In the chemical step, a low concentration of ferric sulfate is used as the lixiviating agent. In the biological step, bacterial films of *Thiobacillus ferrooxidans* attached to an inert solid are used to regenerate the lixiviating agent by converting the ferrous ion into ferric ion through oxidation. The regenerated agent is then recycled to the lixiviation reactor. The material to be treated by the biolixiviation process contains copper sulfides and includes run-of-mine coal minerals, refined concentrates, aggregates, semi-aggregates and distinctive concentrates. The biolixiviation process permits complete extraction of the copper contained in the ore and results in a lixiviation liquor which contains all the copper charge and a low concentration of ferric sulfate similar to the low concentration of ferric sulfate used initially. The copper obtained can be treated without difficulty by means of extraction with solvents and electrolysis in order to obtain cathode copper.

The treatment of flotation concentrates of copper sulfides has numerous legal and economic disadvantages including increasing legal restrictions in the matter of contamination, the exhaustive saturation of the market with sulfuric acid, tough penalties for the sale of flotation concentrates, the high energy costs of traditional pyrometallurgical treatment processes, and the limited flexibility of such processes with respect to the composition of the raw material. Those reasons, among others, have given rise during the last few decades to a growing interest in hydrometallurgy as an alternative treatment of the flotation concentrates of copper sulfides. The main difficulty with hydrometallurgy is the selection of a suitable method of lixiviation which is economical, effective and flexible. Biolixiviation may be considered a suitable alternative treatment of the flotation concentrates of copper sulfides.

Biolixiviation can be defined as a hydrometallurgical operation, in which various components of a metallic ore are degraded by the action of certain chemolithotrophic microorganisms which obtain the energy necessary for their growth from intracellular oxidation of inorganic substances. The species *Thiobacillus ferrooxidans* is noteworthy because it uses ferrous ion in solution and any reduced form of sulfur including the metallic sulfides as energy substrates.

The principal disadvantage of biolixiviation of sulfurated metallic ores is the slow kinetics of this type of process which typically has very long reaction times. The slow reaction rate determines to a considerable extent the industrial device to be used for biolixiviation and also the type of mineral which can be treated with this process. Currently, biolixiviation is only used to process low-grade or even marginal-grade minerals and refractory minerals, and the lixiviation process is performed by percolation in heap or dump leaching systems.

The biolixiviation of sulfurated ores can take place through two different mechanisms, known as the indirect contact and direct contact mechanisms. In the indirect contact mechanism, the ferric ion oxidizes the metallic sulfide producing ferrous sulfate and elemental sulfur which are then reoxidized by the bacteria to regenerate the ferric ion with the production of acid. In the direct contact mechanism, the bacterial action is independent of the presence of ferric ion, and only an intimate physical contact between the bacteria and the surface of the mineral is required. The indirect and direct mechanisms have very different reaction kinetics.

When the bacteria uses the metallic sulfide directly as an energy substrate in the direct contact mechanism, its mean reaction time is on the order of days or even weeks, while the reaction time when ferric ion is used in the indirect contact mechanism ranges from 4 to 8 hours. In spite of the difference in reaction times, the reaction kinetics of indirect biolixiviation are considered slow and prevent its use in the treatment of high-grade minerals or flotation concentrates.

The possibility of improved reaction kinetics in the biolixiviation processes of direct contact is based on the establishment of more active species either by the discovery of new naturally occurring species or by the modification of species already used by means of adaptation techniques or even genetic manipulation. However, the implantation of these cultures may run into serious difficulties, especially that of preventing said prepared strains from losing their identity by mutation after a short operating time.

The possibility of improved reaction kinetics of the biolixiviation mechanism of indirect contact are much greater in the short term than for the direct contact mechanism. To improve the reaction rate of the indirect mechanism, it is only necessary to separate the two processes which take place simultaneously in the lixiviation reactor, namely the chemical attack on the metallic sulfide by the ferric ion and the bacterial oxidation of the ferrous ion produced. This separation permits the improvement of the reaction kinetics of both processes.

The attack of the ferric ion on the metallic sulfides is an electrochemical reaction based on the semiconductor properties of these materials. The kinetics of these reactions are greatly affected by the temperature. At ambient temperatures, the reactions are very slow; however, at moderately high temperatures, even temperatures below the boiling point of water, the reactions are considerably faster. The reactions at higher temperatures are faster because, unlike normal conductors, an increase in the temperature increases the conductivity of the semiconductors.

The mesophilic character of the bacteria normally used prevents the use of higher temperatures to accelerate the lixiviation process; however, the physical separation of the chemical and biological steps has the same accelerating effect on the lixiviation process that increased temperature would have caused.

During the chemical reaction stage, the ferric ion, which acts as a depolarizer, is depleted by reduction to the ferrous ion. To prevent the reaction from stopping when the ferric ion reactant is used up, it is necessary to oxidize the ferrous ion formed to regenerate the primary lixiviating agent. At this stage of the lixiviation process, bacteria play a fundamental role by catalyzing said oxidation process to regenerate the ferric ion lixiviating agent.

When the biolixiviation is carried out in a simple stage in a single reactor, a series of phenomena occur which considerably limit the speed of this oxidation process. When a single reactor is used in which the biolixiviation reactions are mixed, significant abrasion of the bacteria by the mineral particles occurs. Abrasion of the bacteria leads to their partial destruction which results in two negative effects on the kinetics of the process. First, at the half-way point of the process, organic substances from the rupture of the cellular membranes cause disintegration of the bacterial cytoplasm which results in pronounced inhibition of bacterial growth. Secondly, the abrasive effect results in a decrease in the active bacterial count.

After several days of operation of the biolixiviating process in a single reactor, the negative effects of abrasion on the bacteria may result in as much as a twenty-fold reduction in the oxidative activity of the bacterial suspension when compared to the oxidative activity of the original inoculation.

Another consideration in the biolixiviation process involves the supply of gases to the bacteria. Bacteria, in addition to being autotrophs, are aerobes which means that they require an adequate supply of carbon dioxide ($CO_2$) and oxygen ($O_2$). Carbon dioxide is an exclusive source of carbon for the synthesis of the cellular material and the oxygen is a final acceptor of the pairs of electrons generated in the oxidation processes in which they take part.

It is necessary, then, to use a device that permits a continuous supply of these two gases, in amounts as high as permitted by the saturation conditions of the liquid medium in which they are dissolved.

SUMMARY OF THE INVENTION

The bacterial oxidation of the ferrous ion can be carried out with two different devices: the model of bacterial suspension or the carried bacterial film. As their names indicate, in the first device the bacteria are dispersed in a liquid medium which can be mixed or not mixed. In the second device, the bacteria are fixed on a film formed by the bacteria and a binding cement consisting of basic iron sulfates. Said film is carried, in general, on an inert solid in fixed beds or on revolving biological contactors.

Numerous studies comparing the advantages of the suspension and the film devices indicate that the carried film model is much more effective than the bacterial suspension for the following reasons. When the bacteria are dispersed in a liquid medium, they consume a certain amount of energy in carrying out locomotion work. On the other hand, when the bacteria form part of the film, their energy is completely spent in bacterial growth, which causes the coefficient of performance to be considerably greater. In addition, the supply of $O_2$ and $CO_2$ contained in the air is much more direct and therefore more available to the carried bacterial film model.

The ferric sulfate operates according to the following reactions:

$$SCu+2Fe^{3+} \rightarrow S^2+2Fe^{++}+Cu^{++}$$

$$SCu_2+4Fe^{3+} \rightarrow S^o+2Cu^{++}+4Fe^{++}$$

$$S_2CuFe+4Fe^{3+} \rightarrow 2S^o+Cu^{++}+5Fe^{++}$$

However, its direct use according to the stoichiometry of the above reactions would imply that the lixiviating liquor obtained has a ferrous ion concentration between two and five times greater than Cu, which would considerably complicate the subsequent treatment stages.

This problem can be solved by using amounts of ferric sulfate which are much less than the stoichiometry requires.

Once the ferric ion has been depleted and has been converted into ferrous ion, it is sent to a reoxidation stage and is recirculated to the reactor. In this manner, the same lixiviating liquor leaves the reactor, is reoxidized and recirculated continuously before leaving the circuit. At the end, said liquor contains all the corresponding Cu charge and a Fe concentration as low as the Fe concentration initially used.

If the circuit is purged after the reoxidation stage, the content of ferrous salts will be zero. In this manner, the desired objective can be achieved by using ferric sulfate concentrations of less than 10 g/L, some 10 times less than the stoichiometry required for a 10% pulp density.

BRIEF DESCRIPTION OF THE DRAWINGS

The present invention will be better understood from the detailed description below, in combination with the attached drawings in which.

DESCRIPTION OF THE PREFERRED EMBODIMENTS

Figure 1:
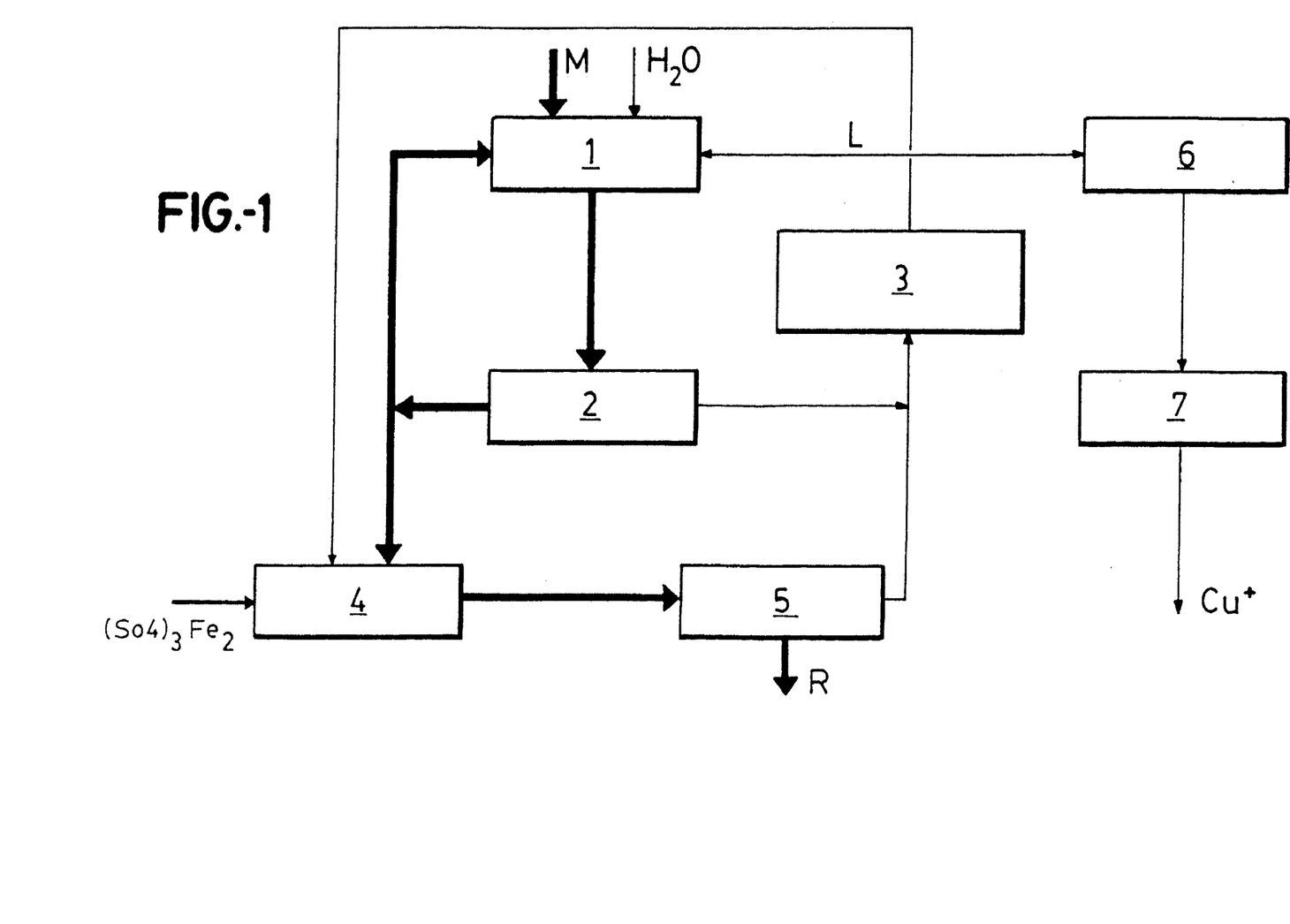
FIGS. 1 and 2 show the flow diagrams of the process of the present invention.

As can be seen in FIG. 1, the process consists of a primary lixiviation stage 1 in a reactor provided with mechanical agitation, in which the mineral M or concentrate reacts, at ambient temperature (between 5° and 40° C.), with a degradation of ferric sulfate having a concentration that is much less than the stoichiometric amount. The concentration of iron in the primary lixiviation reaction is 5 to 15 g/L, preferably 12 g/L. To supply all the ferric sulfate required, it is necessary to continuously regenerate the lixiviating agent as it is being depleted. For this reason, a pulp flow is continuously extracted from the reactor and is sent to the settling tank 2. On the upper part of this tank, the clear phase free from solids emerges via an overflow, and the thickened phase, which mostly returns to the primary lixiviation reactor 1, is extracted by means of a pump on the lower part of said tank.

The clear phase leaving from the settling tank 2, which is partly depleted of ferric ion and charged with ferrous ion, is sent to the biooxidation stage on the carried film 3. This point constitutes the real novelty of the process, and it lends originality and great possibilities for development of lixiviation with a low concentration of ferric sulfate, along with the tremendous advantages which are possible for the treatment of the final liquor obtained. After it passes through this stage and is recharged with ferric ion, most of the liquor returns to the primary lixiviation stage 1, to which water, which is outside of the circuit, is introduced in addition to the mineral M or concentrate. Between 80 and 90% of the ferric ions needed for the chemical lixiviation steps are produced in the biooxidative regenerating step.

To complete the extraction of copper from the thickened pulp from the outlet of the settling tank 2, the mass fraction corresponding to the mineral feed is separated and introduced into a secondary lixiviation reactor 4 together with a fraction of the liquor from the outlet of the biooxidation stage and an external solution of ferric sulfate. The lixiviation reactor 4 is smaller but has characteristics similar to those of the primary lixiviation reactor 1. The extraction of copper is completed in reactor 4, which operates at a temperature ranging between 50° and 90° C. preferably 65° C. The concentration of iron in the secondary lixiviation reaction is 20 to 70 g/L, preferably 35 g/L.

The pulp from the outlet of reactor 4 is filtered in a filter 5 to separate the solid residue R and the filtrate, which contains a significant charge of ferrous ion, is sent to the biooxidation stage 3.

To minimize heat losses, the fraction of liquor coming from the biooxidation stage 3 which enters the secondary lixiviation stage 4 is heated in a liquid-pulp heat exchanger at the expense of the pulp from the outlet of said stage.

The rich liquor L, containing all of the dissolved copper charge and a concentration of iron as low as that initially used is purged at the outlet of the biooxidation stage 3. Said liquor L, after purification and concentration by extraction with solvents in 6, is electrolyzed in 7 to obtain commercial cathode copper of high purity. The depleted electrolyte is used as a reextraction agent, and the watery refined fraction from the extraction stage is used for feeding outside water to the biolixiviation process.

In the specific case of chalcopyritic sulfides, silver is added as a catalytic agent for the lixiviation of chalcopyrite to guarantee the complete extraction of the copper contained therein. For this reason, the concentrate from the inlet to the primary lixiviation stage 1 is saturated with a solution of $Ag^+$, which remains deposited on the surface of the mineral, exercising its catalytic effect on both lixiviations (primary and secondary) 1 and 4.

Figure 2:
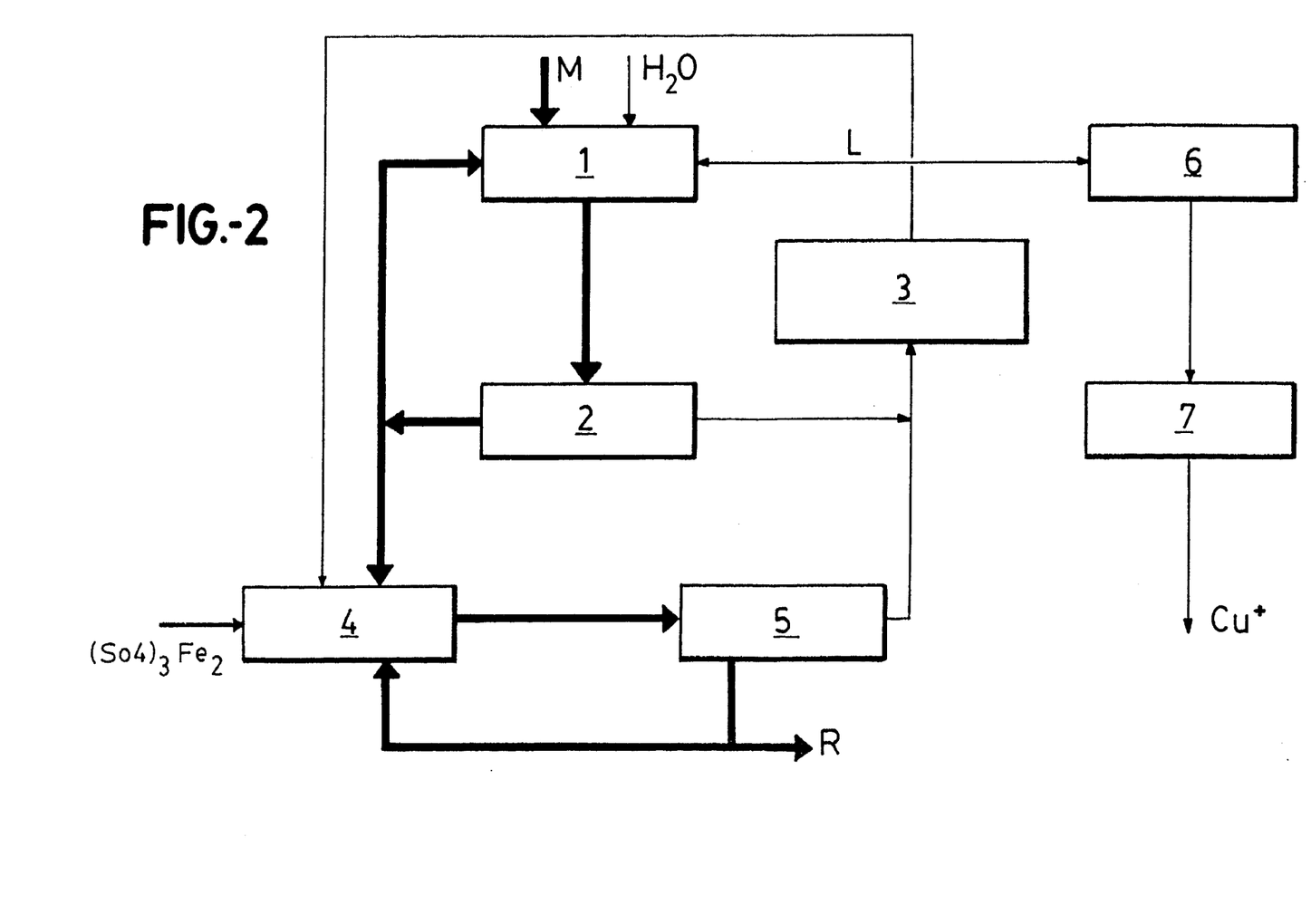

FIG. 2 shows a similar circuit with recirculation of solids in both lixiviation stages: primary and secondary 1 and 4.

Figure 3:
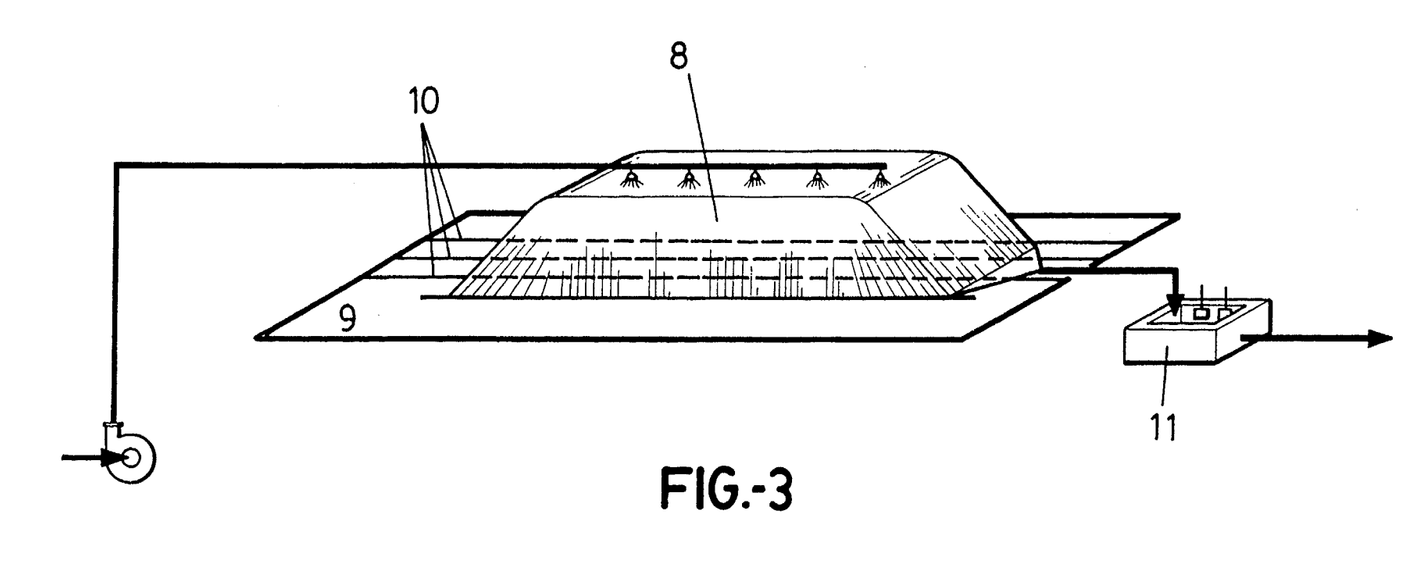
FIG. 3 represents arrangement of the biooxidation dump.

The biooxidation stage 3 is formed by a heap or dump, similar to the lixiviation heaps. As can be seen in FIG. 3, it consists of a bed of carrier material 8, which is ceramic, natural or artificial, or a polymer type (plastic), with a particle size ranging between 1 and 15 mm preferably about 4 mm, arranged on an inclined and waterproofed surface 9, lined on its lower part with pipes for the supply of air 10. On the bottom is placed a first layer of aggregates (1–2 cm particle size) to prevent the clogging of vents and to improve the percolation capacity, and on this layer is placed the layer of carrier material (inert solid), with a layer height ranging between 0.5 and 1 meter. The liquid percolates through the layer, and it is collected in one of the vertices of the dump 11.

Figure 4:
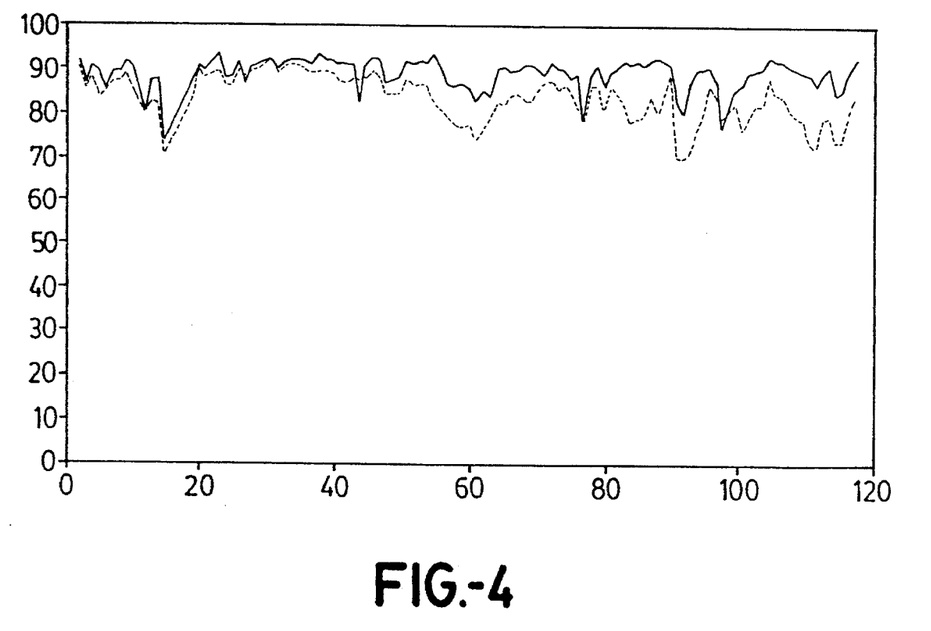
FIG. 4 shows the typical results of this stage operating on a continuous basis.

As can be seen in FIG. 4, the oxidative capacity of the dump remains high after a prolonged operating time, with no percolation problems or aging phenomena of the bacterial films being detected. The percentage of oxidation Fe(II) is shown on the ordinates, and time expressed in days is shown on the abscissas. The dotted line corresponds to the extraction to the right, and the solid line corresponds to the extraction to the left.

EXAMPLE NO. 1

Figure 5:
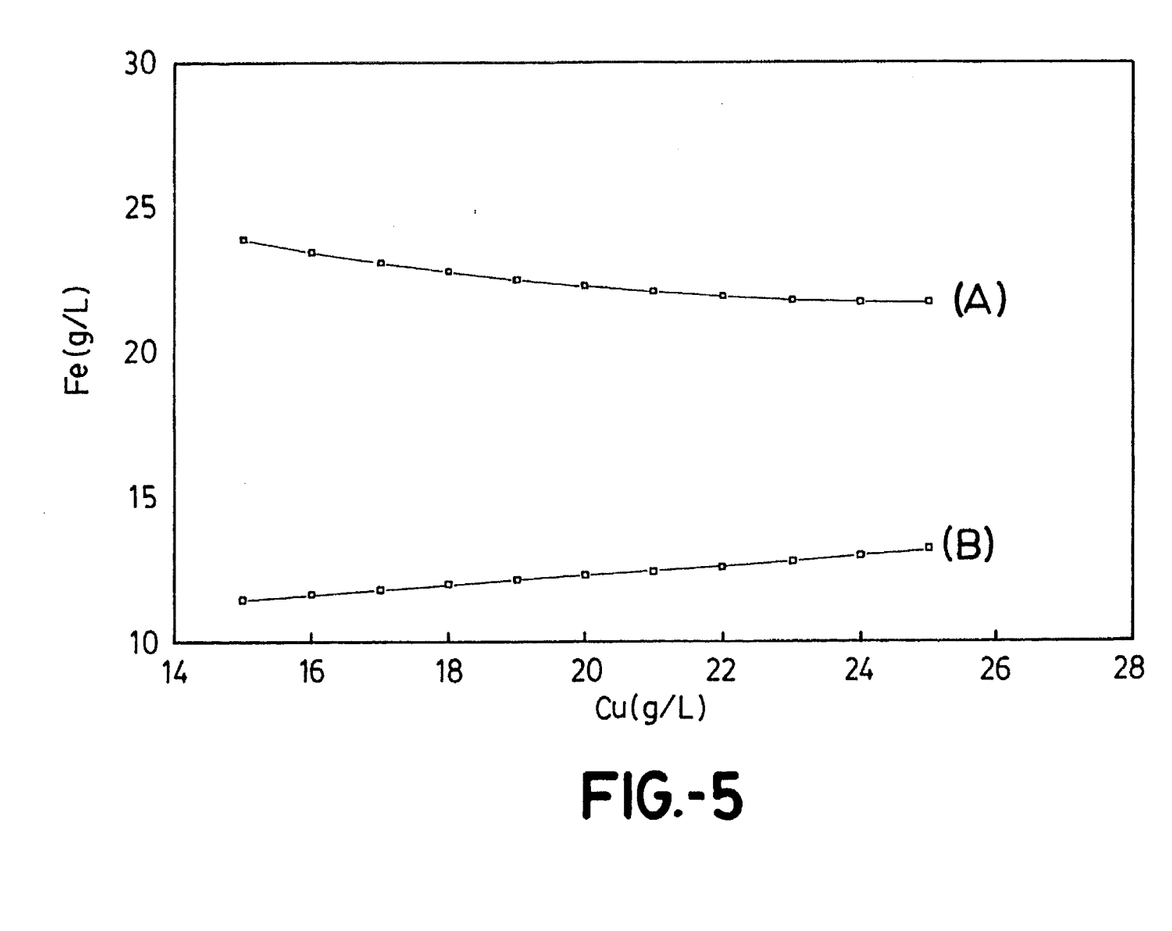
FIGS. 5 and 6 show the results obtained in actual tests.

For a refined concentrate with a 6% copper grade, the complete operating data for each ton/hour of concentrate would be as follows:

Total demand of ferric [sulfate]: 80 kg
Demand of ferric sulfate in cold: 20 kg
Demand of ferric sulfate in heat to 70° C.: 60 kg
Mean residence time in cold: 3 hours
Density of pulp in cold: 40% (W/V)
Volume of reaction in cold: 7.5 m$^3$
Mean residence time in heat: 3 hours
Density of pulp in heat: 30% (W/V)
Volume of reaction in heat: 10 m$^3$
No recirculation of solids in heat
Composition of liquor from outlet: 13 g/L Fe and 20 g/L Cu
Volume of liquor from outlet: 2.9 m$^3$ FIG. 5 shows how the copper concentration at the outlet varies as a function of the iron concentrations used in each of the circuits. Line A reflects the hot circuit, and line B reflects the biological circuit.

EXAMPLE NO. 2

Figure 6:
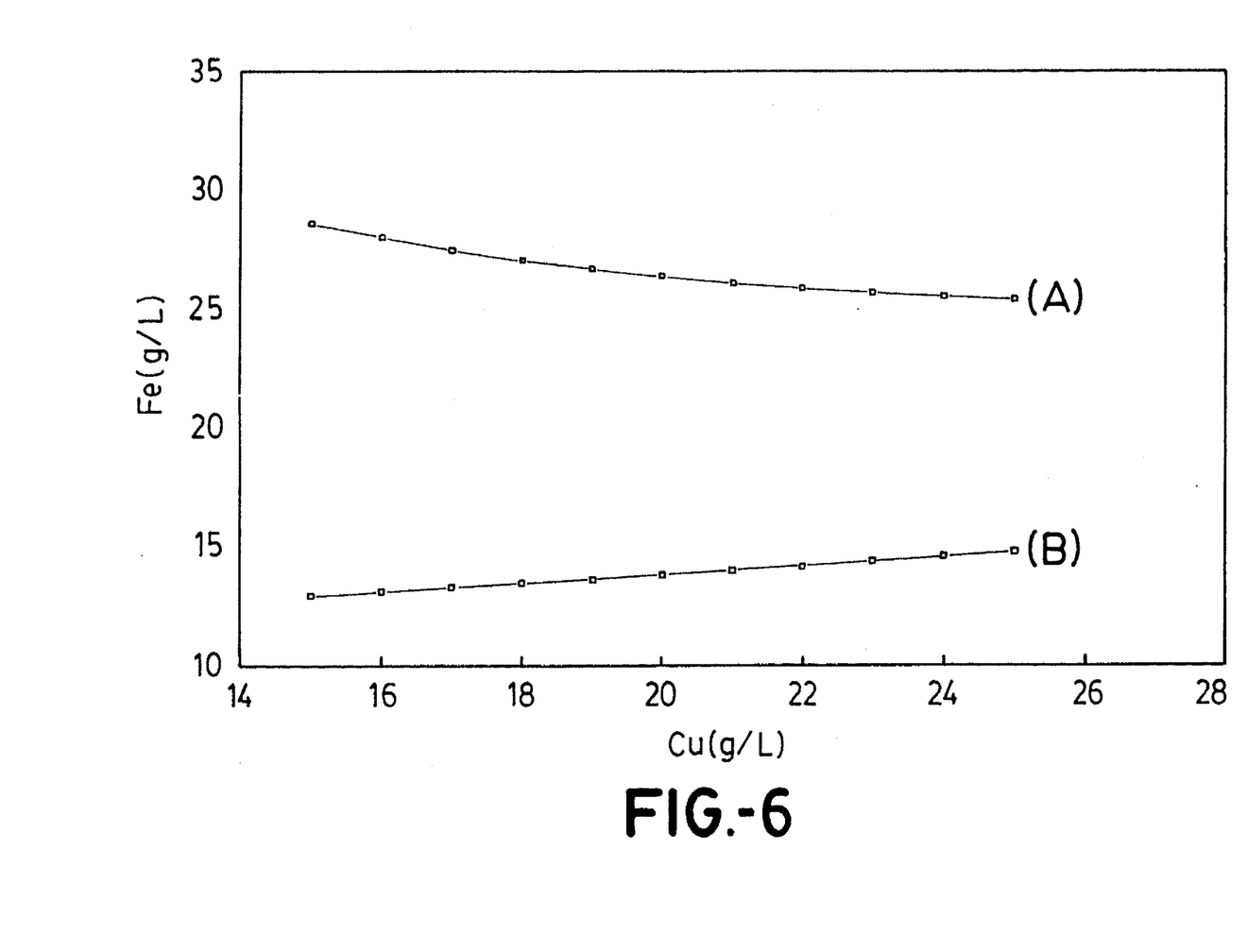

For a final concentrate with a 50% copper grade, the complete operating data for each ton/hour of concentrate would be as follows:

Total demand of ferric sulfate: 700 kg
Demand of ferric sulfate in cold: 200 kg
Demand of ferric sulfate in heat to 70° C.: 500 kg
Mean residence time in cold: 3 hours
Density of pulp in cold: 25% (W/V)
Volume of reaction in cold: 12 m$^3$
Mean residence time in heat: 4 hours
Density of pulp in heat: 25% (W/V)
Volume of reaction in heat: 16 m$^3$
Recirculation of solids in heat: 5/6
Composition of liquor from outlet: 14 g/L Fe and 20 g/L Cu
Volume of liquor from outlet: 24.5 m$^3$ FIG. 6 shows how the copper concentration at the outlet varies as a function of the iron concentrations used in each of the circuits. Line A reflects the hot circuit, and line B reflects the biological circuit.

I claim:

1. A process for biolixiviating minerals from copper sulfides or flotation concentrates thereof, said method comprising the steps of:

(a) subjecting said copper sulfides or flotation concentrates thereof to a chemical lixiviation, said chemical lixiviation being performed in two stages, (i) a first stage comprising primary lixiviation in pulp at a temperature ranging between 5° and 40° C. in a primary lixiviation reactor with mechanical agitation, and (ii) a second stage comprising secondary lixiviation in pulp at a temperature ranging between 50° and 90° C. in a secondary lixiviation reactor with mechanical agitation, said primary lixiviation reaction comprising treating said copper sulfides or flotation concentrates with a lixiviating agent comprising ferric ions at an initial concentration ranging between 5 and 15 g/L and resulting in the formation of a mineral pulp comprising said minerals and a primary lixiviation liquor which comprises extracted copper and ferrous ions produced by reduction of said lixiviating agent, a fraction of the pulp from said primary lixiviation being recirculated to said first stage, and said secondary lixiviation comprising treating the non-recirculated fraction of pulp from said primary lixiviation with a lixiviating agent comprising ferric ions at an initial concentration ranging between 20 and 70 g/L and resulting in the formation of a pulp comprising a solid residue and a secondary lixiviation liquor which comprises the extracted copper and the ferrous ions;

(b) separating said primary lixiviation liquor from said mineral pulp and transporting the separated primary lixiviation liquor to a biooxidation vessel;

(c) separating said secondary lixiviation liquor from the pulp comprising said solid residue, and transporting the separated secondary lixiviation liquor to a biooxidation vessel and recirculating the pulp comprising the solid residue to said secondary lixiviation reactor;

(d) regenerating said lixiviating agent by contacting said primary and secondary lixiviation liquor, containing ferrous ions, with a ferrooxidant microorganism immobilized on a solid support in said biooxidation vessel, said contacting resulting in conversion of said ferrous ions to ferric ions, thereby producing a regenerated lixiviation agent comprising said extracted copper and said ferric ions; and (e) returning said regenerated lixiviation agent to said primary and secondary lixiviation reactors.

2. Process in accordance with claim 1, characterized in that the regenerating of the lixiviation agent is carried out on bacterial films carried on said inert solids arranged as a fixed bed or revolving biological contactors.

3. Process in accordance with claim 2, characterized in that the fixed bed, comprises a particulate material selected from the group consisting of: ceramic material, natural or artificial material, and polymer material.

4. Process in accordance with claim 3 in which said particulate material comprises a particle size range from about 1 mm to about 15 mm.

5. Process in accordance with claim 4 in which the particle size is about 4 mm.

6. Process in accordance with claim 1, characterized in that the copper sulfides or flotation concentrates thereof are selected from the group of materials consisting of: run-of-mine coal minerals, refined concentrates, aggregates, semi-aggregates and concentrates.

7. Process in accordance with claim 1 in which the secondary lixiviation is carried out at 65° C.

8. Process in accordance with claim 1, characterized in that between 80% and 90% of the ferric ions for said chemical lixiviation are produced in the regenerating step and between 10% and 20% of the ferric ions for the chemical lixiviation are provided from an external source.

9. Process in accordance with claim 8, characterized in that the combined concentration of iron in the primary lixiviation and biooxidation vessel is 5 to 15 g/L, and the concentration of iron in the secondary lixiviation is 20 to 70 g/L.

10. Process in accordance with claim 9 in which the combined concentration of iron in the primary lixiviation and the biooxidation vessel is about 12 g/L and the concentration of iron in the secondary lixiviation is about 35 g/L.

11. Process in accordance with claim 1, characterized in that the copper sulfide comprises concentrates of chalcopyritic copper and silver is added as a catalytic agent to the primary lixiviation.

12. Process in accordance with claim 1, characterized in that the primary lixiviation and secondary lixiviation produce a final residue that comprises elemental sulfur and a rich liquor that comprises the extracted copper.

13. Process in accordance with claim 12, characterized in that the rich liquor is treated by extraction with solvents and electrolysis in order to obtain a cathode copper of high purity.

14. Process according to claim 1, wherein said ferrooxidant microorganism is *Thiobacillus ferrooxidans*.

\* \* \* \* \*

UNITED STATES PATENT AND TRADEMARK OFFICE
CERTIFICATE OF CORRECTION

PATENT NO. : 5,462,720

DATED : October 31, 1995

INVENTORS : Juan L.B. Aragonés

It is certified that errors appear in the above-identified patent and that said Letters Patent is hereby corrected as shown below:

Column 3, line 55, "SCu + 2Fe$^{3+}$ ----------> S$^2$ + 2Fe$^{++}$ + Cu$^{++}$"
should be --SCu + 2Fe$^{3+}$ ----------> S$^°$ + 2Fe$^{++}$ + Cu$^{++}$--

Signed and Sealed this

Sixteenth Day of January, 1996

*Attest:*

BRUCE LEHMAN

*Attesting Officer*     *Commissioner of Patents and Trademarks*

UNITED STATES PATENT AND TRADEMARK OFFICE
CERTIFICATE OF CORRECTION

PATENT NO. : 5,462,720
DATED : October 31, 1995
INVENTOR(S) : Juan L.B. Aragonés It is certified that error appears in the above-indentified patent and that said Letters Patent is hereby corrected as shown below:

On title page,
The Assignee should read: --[73] Iskay Servicios Metalúrgicos SRL--

Signed and Sealed this

Twenty-fifth Day of February, 1997

Attest:

BRUCE LEHMAN

*Attesting Officer*    *Commissioner of Patents and Trademarks*